A. WOLFSHOLZ.
METHOD OF CONSOLIDATING LOOSE SOILS, QUICKSAND, &c.
APPLICATION FILED AUG. 26, 1908.
935,081.
Patented Sept. 28, 1909.
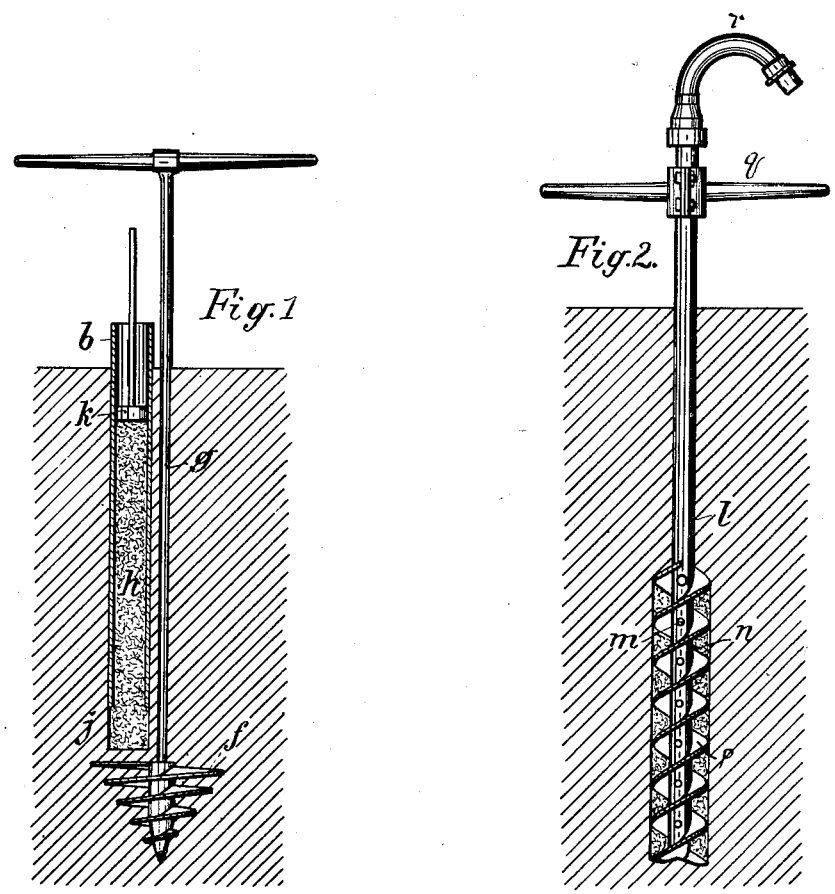

UNITED STATES PATENT OFFICE.

AUGUST WOLFSHOLZ, OF WILMERSDORF, BERLIN, GERMANY.

METHOD OF CONSOLIDATING LOOSE SOILS, QUICKSAND, &c.

935,081.

Specification of Letters Patent. Patented Sept. 28, 1909.

Application filed August 26, 1908. Serial No. 450,399.

*To all whom it may concern:*

Be it known that I, AUGUST WOLFSHOLZ, a citizen of the Empire of Germany, residing at Wilmersdorf, Berlin, in the Empire of Germany, have invented a new and useful Method of Consolidating Loose Soils, Quicksand, &c., of which the following is a specification.

Attempts to consolidate loose soils, quicksand, etc. by introducing a binding medium, such as for example cement, under pressure into the soil, have proved unsatisfactory, chiefly for the reason that it is impossible to introduce under pressure powdery cement or milk of cement into wet sand, since the soil acts like a filter, so that the particles of cement are retained in the uppermost strata and form a tightening cover or layer, which prevents the binding medium from penetrating farther downward. Further attempts to cut and tear up the soil by means of foundation tubes while simultaneously introducing the cement through these tubes have also failed, because during the driving of the tubes into the soil the cement introduced was at once caught and then formed a tight cover in the upper strata.

My invention relates to an improved method of consolidating loose soils, quicksand, etc. whereby better results are obtained. The method depends upon the condition of the soil or other circumstances.

When the soil contains sufficient water, the method consists in first introducing a charge of binding medium, such as cement, hydraulic lime with sand, or the like, into the ground without mixing it with the latter; and in afterward mixing the binding medium with the ground by moving the latter with a tool, the water contained in the soil being used for moistening the mixture, so that a body in the soil is formed of the right cement-mortar, concrete or the like, which then hardens and consolidates the soil, quicksand, etc.

When the soil does not contain sufficient water, or the circumstances render it advisable, the method consists in first driving a perforated tube provided on its outside with one or several screw-blades similar to those of an auger into the soil, then forcing water through the tube and its perforations for loosening and moving the soil, and afterward forcing the binding medium in a semi-liquid state through the tube and its perforations into the loosened and moved soil, while withdrawing the screw-bladed tube and mixing the binding medium with the soil so as to form a body in the soil of cement-mortar, or concrete, or the like.

I will now proceed to describe my invention with reference to the accompanying drawing, which illustrates the two modes of execution of the method.

In the mode of execution of the method according to Figure 1 first an earth-drill or ground-auger $g$ with comparatively large screw-blades $f$ is driven into the soil, quicksand, etc. down to a convenient depth, then a tube $b$ is in any known manner driven into the soil within the reach of the screw-blades $f$ of the earth-drill $g$ down to say the line $j$, and the soil within the tube $b$ is extracted in any known manner. Thereupon the tube $b$ is filled with cement $h$ or the like down to the bottom $j$, and a piston $k$ is placed upon the filling. The piston $k$ is kept downward by means of its rod $o$ while the tube $b$ is withdrawn from the soil, so that the cement $h$ or the like is left behind in the hole. At last the ground-auger $g$ is turned back, so that its screw-blades $f$ cut into the cement or the like and constantly move it through the soil for mixing it with the latter. As the ground contains sufficient water, a body will be formed in the soil of cement-mortar, or concrete or the like which hardens. Where so preferred, the tube $b$ may be driven into the soil concentrically with the ground-auger $g$ or nearly so. In this manner the soil, quicksand, etc. can be consolidated on certain places. If so desired, the operation can be repeated according to a plan determined, so that pillars, walls, reservoirs, pits, or other structures are formed in the soil.

The other mode of execution of the method illustrated by Fig. 2 is particularly suitable for quicksand and is as follows: A sort of water jet auger, that is a tube $l$ as shaft with a series of holes $m$ in it and with one or several screw-blades $p$ on it is driven into the soil by means of a cross-bar $q$ or the like and is connected with a bent pipe $r$ and a hose (not shown) attached thereto. By means of some pump or the like water is forced through the hose, the bent pipe $r$ and the tube $l$, so that the jets of water coming from the several holes $m$ $m$ will loosen and move the soil around the tube $l$ between the screw-blades $p$. Afterward instead of the water a binding medium in a semi-liquid state is forced through the tube *l* and its perforations *m* into the loosened and moved soil *n*, so that during the continued rotation of the tube *l* the screw-blades *p* will mix the soil with the binding medium, so that a body in the soil will be formed of the mixture (cement-mortar or concrete or the like), which hardens. Obviously the perforated screw-bladed tube *l* requires to be withdrawn from the soil, before the mixture hardens. By boring holes in series or in any other order into the soil, introducing the semi-liquid binding medium into the holes and withdrawing the tool again pillars, walls, pits or other structures of cement-mortar or concrete or the like can be formed in the soil for consolidating it. The screw-blades *p* may be provided with projections or the like for better mixing the soil with the binding medium. Instead of the perforated screw-bladed tube described any other known tool may be used, which can produce a similar effect.

I claim:

1. The method of consolidating loose soils, quicksand, or the like, which consists in driving a tool into the soil, forcing water through the tool for loosening and moving the soil while moistening it, forcing a binding medium in a semi-liquid state through the tool into the loosened and moved soil, and withdrawing the tool while thereby mixing the soil with the binding medium, so that a body in the soil is formed of the mixture which hardens.

2. The method of consolidating loose soils, quicksand, or the like, which consists in driving a tool into the soil, forcing water through the tool for loosening and moving the soil while moistening it, forcing a binding medium in a semi-liquid state through the tool into the loosened and moved soil, and at the same time withdrawing the tool while thereby mixing the soil with the binding medium, so that a body in the soil is formed of the mixture which hardens.

3. The method of consolidating loose soils, quicksand, or the like, which consists in driving a tool into the soil, forcing water through the tool for loosening and moving the soil while moistening it, forcing a binding medium in a semi-liquid state through the tool into the loosened and moved soil, withdrawing the tool while thereby mixing the soil with the binding medium, so that a body in the soil is formed of the mixture which hardens, and repeating the operations on various places so as to form consolidating structures in the soil.

4. The method of consolidating loose soils, quicksand, or the like, which consists in driving a tool into the soil, forcing water through the tool for loosening and moving the soil while moistening it, forcing a binding medium in a semi-liquid state through the tool into the loosened and moved soil and at the same time withdrawing the tool while thereby mixing the soil with the binding medium, so that a body in the soil is formed of the mixture which hardens, and repeating the operations on various places so as to form consolidating structures in the soil.

5. The method of consolidating loose soils, quicksand, or the like, which consists in driving a tool into the soil for loosening and moving it, driving a tube into the soil within the reach of said tool, extracting the soil from the tube, filling the tube with a binding medium, withdrawing the tube while pressing downward its charge, and withdrawing said tool while thereby mixing the soil with the binding medium, so that a body in the soil is formed of the mixture which hardens.

6. The method of consolidating loose soils, quicksand, or the like, which consists in driving a tool into the soil for loosening and moving it, driving a tube into the soil within the reach of said tool, extracting the soil from the tube, filling the tube with a binding medium, withdrawing the tube while pressing downward its charge, withdrawing said tool while thereby mixing the soil with the binding medium, so that a body in the soil is formed of the mixture which hardens, and repeating the operations on various places so as to form consolidating structures in the soil.

7. The method of consolidating loose soils, quicksand, or the like, which consists in driving an earth-drill with large screw-blades into the soil, driving a tube into the soil within the reach of the screw-blades of said earth-drill, extracting the soil from the tube, filling the tube with a binding medium, withdrawing the tube while pressing downward its charge, and withdrawing said earth-drill while mixing by means of its screw-blades the soil with the binding medium, so that a body in the soil is formed of the mixture which hardens.

8. The method of consolidating loose soils, quicksand, or the like, which consists in driving an earth-drill with large screw-blades into the soil, driving a tube into the soil within the reach of the screw-blades of said earth-drill, extracting the soil from the tube, filling the tube with a binding medium, withdrawing the tube while pressing downward its charge, withdrawing said earth-drill while mixing by means of its screw-blades the soil with the binding medium, so that a body in the soil is formed of the mixture which hardens, and repeating the operations on various places so as to form consolidating structures in the soil.

9. The method of consolidating loose soils, quicksand, or the like, which consists in driving a perforated screw-bladed tube into the soil, forcing water through the tube and its perforations so as to loosen and move with the jets of water the soil while moistening it, forcing a binding medium in a semi-liquid state through the tube and its perforations into the loosened and moved soil, and withdrawing the perforated screw-bladed tube while mixing by means of its screw-blades the soil with the binding medium, so that a body in the soil is formed of the mixture which hardens.

10. The method of consolidating loose soils, quicksand, or the like, which consists in driving a perforated screw-bladed tube into the soil, forcing water through the tube and its perforations so as to loosen and move with the jets of water the soil while moistening it, forcing a binding medium in a semi-liquid state through the tube and its perforations into the loosened and moved soil, and at the same time withdrawing the perforated screw-bladed tube while mixing by means of its screw-blades the soil with the binding medium, so that a body in the soil is formed of the mixture which hardens.

11. The method of consolidating loose soils, quicksand, or the like, which consists in driving a perforated screw-bladed tube into the soil, forcing water through the tube and its perforations so as to loosen and move with the jets of water the soil while moistening it, forcing a binding medium in a semi-liquid state through the tube and its perforations into the loosened and moved soil, withdrawing the perforated screw-bladed tube while mixing by means of its screw-blades the soil with the binding medium, so that a body in the soil is formed of the mixture which hardens, and repeating the operations on various places so as to form consolidating structures in the soil.

12. The method of consolidating loose soils, quicksand, or the like, which consists in driving a perforated screw-bladed tube into the soil, forcing water through the tube and its perforations so as to loosen and move with the jets of water the soil while moistening it, forcing a binding medium in a semi-liquid state through the tube and its perforations into the loosened and moved soil and at the same time withdrawing the perforated screw-bladed tube while mixing by means of its screw-blades the soil with the binding medium, so that a body in the soil is formed of the mixture which hardens, and repeating the operations on various places so as to form consolidating structures in the soil.

AUGUST WOLFSHOLZ.

Witnesses:
WOLDEMAR HAUPT,
ARTHUR SCHROEDER.